(12) United States Patent　　(10) Patent No.: US 10,824,350 B2
Stephens et al.　　(45) Date of Patent: Nov. 3, 2020

(54) HANDLING CONTINGENT AND NON-CONTINGENT MEMORY ACCESS PROGRAM INSTRUCTIONS MAKING USE OF DISABLE FLAG

(71) Applicant: ARM LIMITED, Cambridge (GB)

(72) Inventors: Nigel John Stephens, Cambridge (GB); Grigorios Magklis, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/309,190

(22) PCT Filed: May 18, 2017

(86) PCT No.: PCT/EP2017/062043
§ 371 (c)(1),
(2) Date: Dec. 12, 2018

(87) PCT Pub. No.: WO2018/001643
PCT Pub. Date: Jan. 4, 2018

(65) Prior Publication Data
US 2019/0171376 A1　　Jun. 6, 2019

(30) Foreign Application Priority Data

Jun. 29, 2016　(EP) .................................... 16386010

(51) Int. Cl.
*G06F 3/06*　　(2006.01)
*G06F 21/79*　　(2013.01)
(Continued)

(52) U.S. Cl.
CPC .......... *G06F 3/0622* (2013.01); *G06F 3/0637* (2013.01); *G06F 3/0659* (2013.01);
(Continued)

(58) Field of Classification Search
CPC .... G06F 3/0622; G06F 21/79; G06F 12/1483; G06F 12/1027; G06F 3/0637;
(Continued)

(56) References Cited

U.S. PATENT DOCUMENTS

| | | | | |
|---|---|---|---|---|
| 5,864,692 A | * | 1/1999 | Faraboschi | G06F 9/3842 711/163 |
| 7,178,062 B1 | * | 2/2007 | Dice | G06F 9/524 710/260 |

(Continued)

FOREIGN PATENT DOCUMENTS

WO　　98/27485　　6/1998

OTHER PUBLICATIONS

International Search Report and Written Opinion of the ISA for PCT/EP2017/062043 dated Jul. 13, 2017, 12 pages.
Extended European Search Report for EP16386010.9 dated Oct. 20, 2016, 9 pages.

*Primary Examiner* — Hong C Kim
(74) *Attorney, Agent, or Firm* — Nixon & Vanderhye P.C.

(57) ABSTRACT

A data processing apparatus and method serve to manage access permission checking in respect of contingent memory access operations (the access permission failure of which does not alter program flow) in dependence of a contingent-access permission checking disable flag. If the contingent access disable flag has a first value, then this disables memory permission circuitry e.g. a walk state machine 22, from performing a check as to whether or not the memory access circuitry is permitted to perform a requested memory access. Non-contingent memory accesses are able to utilise the memory permission circuitry irrespective of the value of the contingent-access permission checking disable flag.

15 Claims, 6 Drawing Sheets

Figure 1:
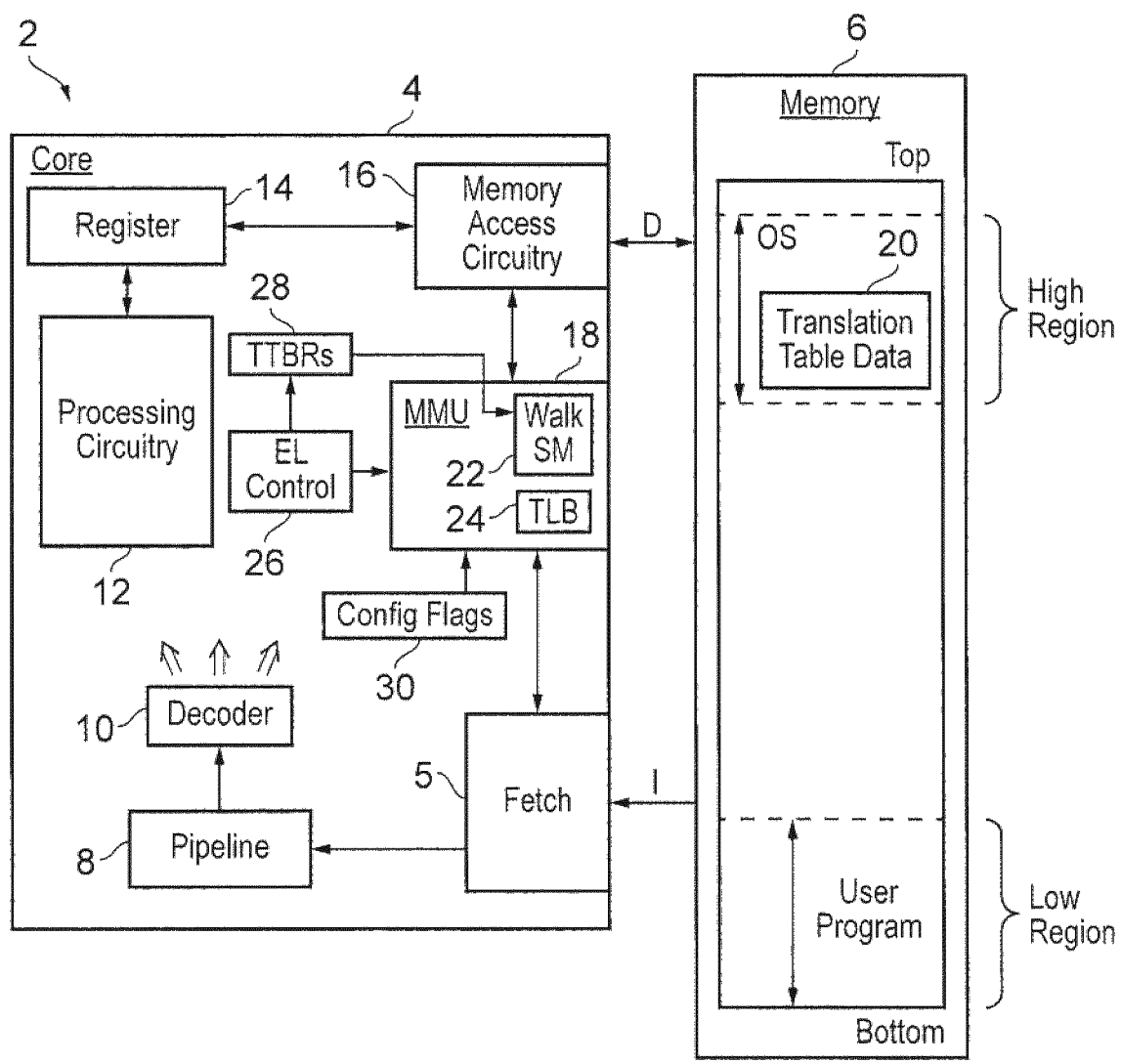

(51) Int. Cl.
    *G06F 12/14*      (2006.01)
    *G06F 12/1027*    (2016.01)
    *G06F 9/30*       (2018.01)
    *G06F 12/10*      (2016.01)

(52) U.S. Cl.
    CPC ........ *G06F 3/0673* (2013.01); *G06F 9/30058* (2013.01); *G06F 12/10* (2013.01); *G06F 12/1027* (2013.01); *G06F 12/1483* (2013.01); *G06F 21/79* (2013.01); *G06F 2212/1044* (2013.01); *G06F 2212/657* (2013.01); *G06F 2212/684* (2013.01); *G06F 2221/2141* (2013.01)

(58) Field of Classification Search
    CPC .. G06F 3/0659; G06F 3/0673; G06F 9/30058; G06F 12/10; G06F 2221/2141; G06F 2212/684; G06F 2212/1044; G06F 2212/657
    USPC .......... 711/163, 202, 203, 206, 170; 710/36
    See application file for complete search history.

(56) References Cited

U.S. PATENT DOCUMENTS

| | | | |
|---|---|---|---|
| 2008/0250216 A1* | 10/2008 | Kershaw | G06F 9/322 711/163 |
| 2010/0011198 A1* | 1/2010 | Hooker | G06F 1/3203 713/1 |
| 2010/0023703 A1* | 1/2010 | Christie | G06F 9/466 711/147 |
| 2010/0205408 A1* | 8/2010 | Chung | G06F 9/466 712/216 |
| 2012/0042144 A1* | 2/2012 | Grisenthwaite | G06F 12/145 711/E12.091 |
| 2015/0347052 A1* | 12/2015 | Grisenthwaite | G06F 12/1425 711/163 |
| 2016/0210069 A1* | 7/2016 | Lutas | G06F 3/0664 |
| 2017/0344492 A1* | 11/2017 | Bolbenes | G06F 12/1027 |
| 2018/0203756 A1* | 7/2018 | Stephens | G06F 9/30036 |
| 2020/0142700 A1* | 5/2020 | Barnes | G06F 12/1458 |

* cited by examiner

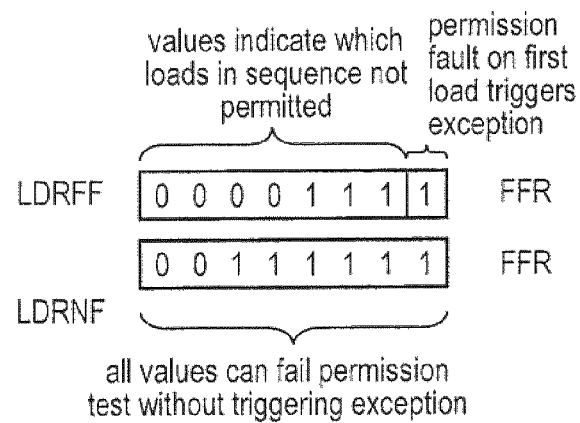
FIG. 6
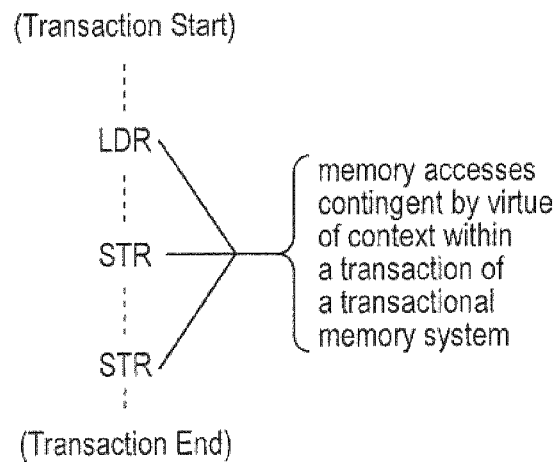
FIG. 7
Prefetch (Add, Len)
FIG. 8

HANDLING CONTINGENT AND NON-CONTINGENT MEMORY ACCESS PROGRAM INSTRUCTIONS MAKING USE OF DISABLE FLAG

This application is the U.S. national phase of International Application No. PCT/EP2017/062043 filed May 18, 2017 which designated the U.S. and claims priority to EP Patent Application No. 16386010.9 filed Jun. 29, 2016, the entire contents of each of which are hereby incorporated by reference.

This disclosure relates to the field of data processing systems. More particularly, this disclosure relates to permission control within data processing systems supporting contingent memory access program instructions.

Contingent memory access program instructions allow software-managed speculation to be performed in respect of memory access operations, i.e. a contingent memory access program instruction will specify at least one contingent memory access operation and the program flow to a next program instruction will not be changed dependent upon whether or not the contingent memory access operation is permitted, e.g. an exception is not triggered if the contingent memory access operation fails its permission conditions. A potential security issue with systems supporting contingent memory access program instructions is that they may facilitate a malicious party obtaining information concerning the configuration of the system by using such contingent memory access program instructions to "scan" the memory address space, without triggering exceptions or operating system intervention, and then use techniques, such as timing analysis, to determine which portions of the memory address space are mapped or configured in particular ways.

At least some embodiments of the present disclosure provide apparatus for processing data comprising:
  memory access circuitry responsive to a memory access program instruction of a program to perform one or more memory accesses within a memory address space, wherein
    when said memory access program instruction is a contingent memory access program instruction, said one or more memory accesses include at least one contingent memory access and program flow to a next program instruction to be executed following said contingent memory access program instructions is independent of whether said at least one contingent memory access is permitted; and
    when said memory access program instruction is a non-contingent memory access program instruction, said one or more memory accesses are one or more non-contingent memory accesses and program flow to a next program instruction to be executed following said non-contingent memory access program instructions is dependent upon whether said one or more non-contingent memory accesses is permitted; and
  memory permission circuitry to control whether said memory access circuitry is permitted to perform said memory access, wherein
    in respect of said one or more contingent memory accesses, said memory permission circuitry is responsive to a contingent-access permission checking disable flag having a first value to disable said control by said memory permission circuitry and to said contingent-access permission checking disable flag having a second value to enable said control by said memory permission circuitry; and
    in respect of said one or more non-contingent memory accesses, said control by said memory permission circuitry is independent of said contingent-access permission checking disable flag.

At least some embodiments of the present disclosure provide a method of processing data comprising:
  in response to a memory access program instruction of a program, performing one or more memory accesses within a memory address space, wherein
    when said memory access program instruction is a contingent memory access program instruction, said one or more memory accesses include at least one contingent memory access and program flow to a next program instruction to be executed following said contingent memory access program instructions is independent of whether said at least one contingent memory access is permitted; and
    when said memory access program instruction is a non-contingent memory access program instruction, said one or more memory accesses are one or more non-contingent memory accesses and program flow to a next program instruction to be executed following said non-contingent memory access program instructions is dependent upon whether said one or more non-contingent memory accesses is permitted;
  controlling whether said memory access is permitted using memory permission circuitry, wherein in respect of said one or more contingent memory accesses, in response to a contingent-access permission checking disable flag having a first value, disabling said control by said memory permission circuitry and, in response to said contingent-access permission checking disable flag having a second value, enabling said control by said memory permission circuitry; and
    in respect of said one or more non-contingent memory accesses, said control by said memory permission circuitry is independent of said contingent-access permission checking disable flag.

At least some embodiments of the present disclosure provide a computer program for controlling a computer to provide a virtual machine execution environment corresponding to the apparatus described above.

Figure 2:
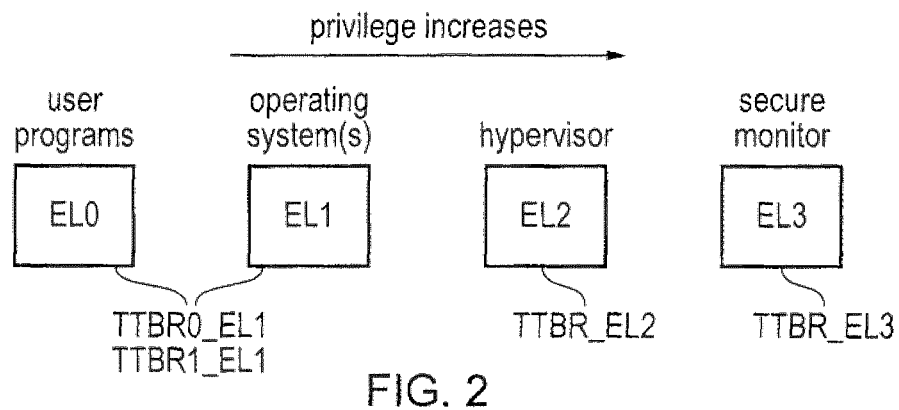
Figure 3:
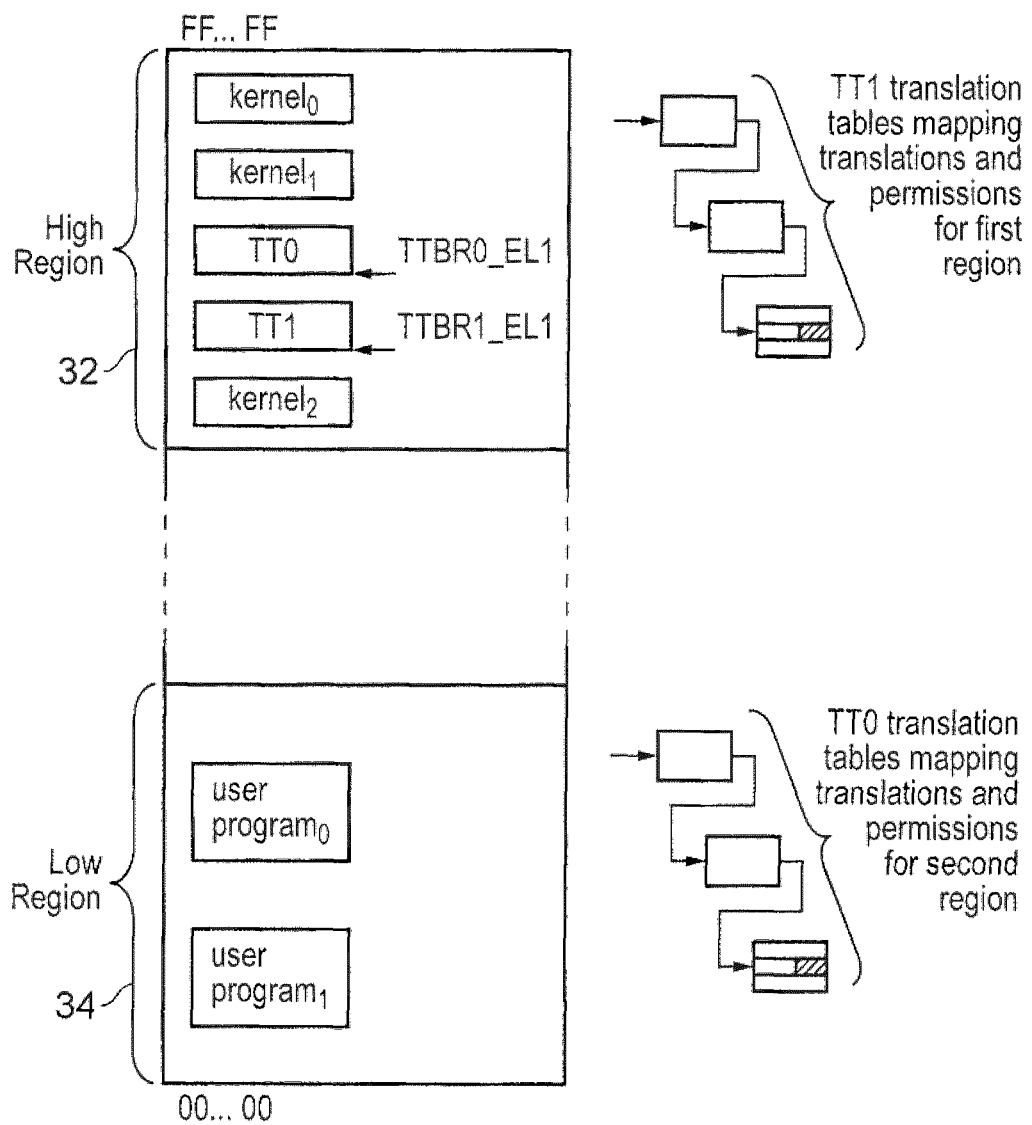
Figures 4, 5:
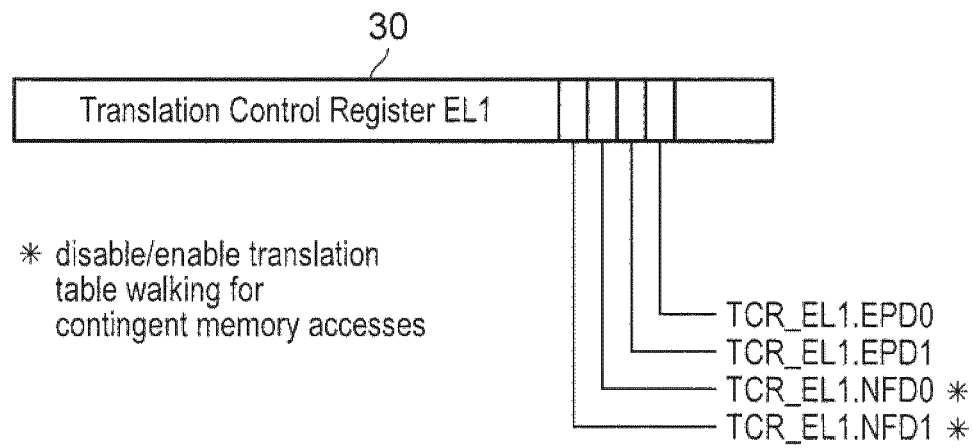
Figure 9:
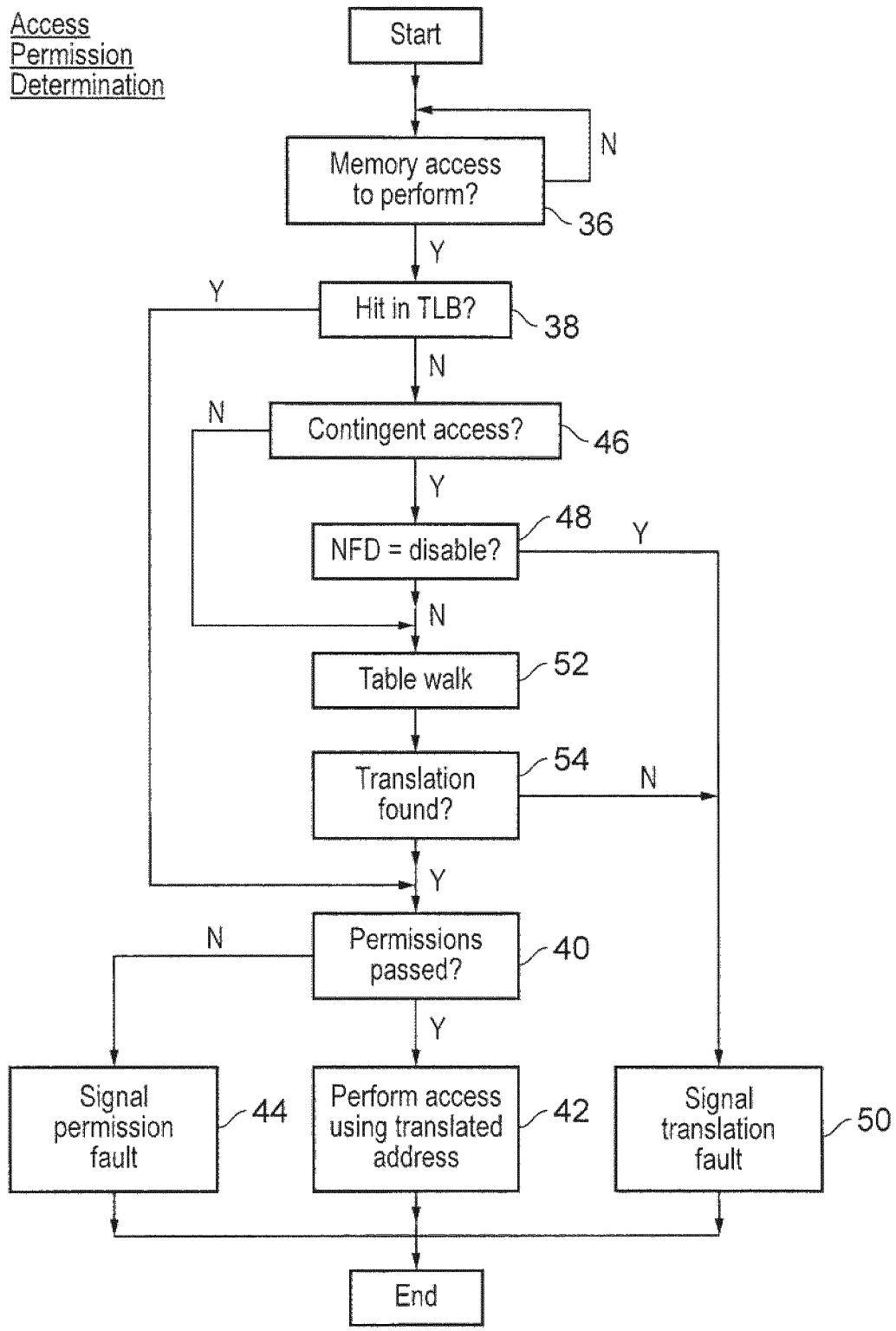
Figure 10:
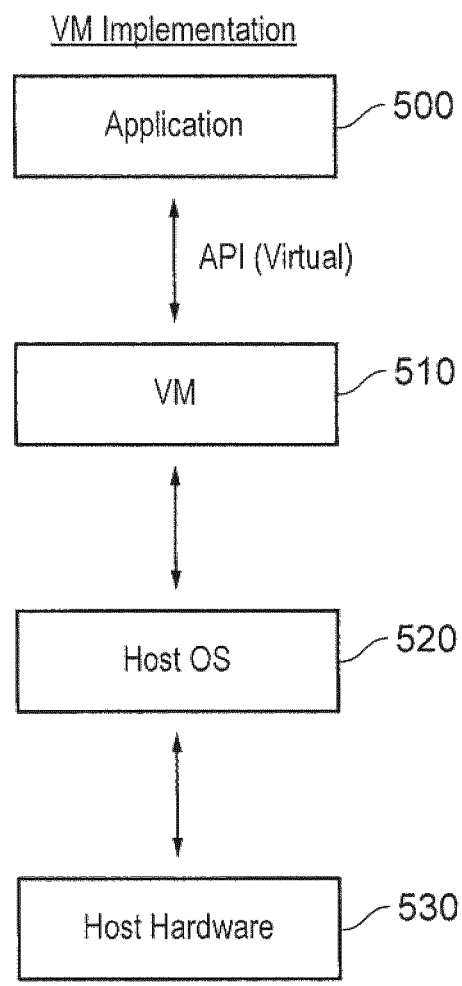

Example embodiments will now be described, by way of example only, with reference to the accompanying drawings in which:

FIG. 1 schematically illustrates a data processing system supporting contingent memory access program instructions and using memory permission circuitry;

FIG. 2 schematically illustrates multiple exception levels and associated pointers to translation table data including permission data;

FIG. 3 schematically illustrates the memory address space of the system of FIG. 1 configured to include a high region and a low region each having their own associated translation tables;

FIG. 4 schematically illustrates a translation control register storing configuration flags including contingent-access permission checking disable flags;

FIG. 5 is a table illustrating how contingent-access permission checking disable flags for two memory regions may be set for different types of operation;

FIG. 6 schematically illustrates contingent memory access program instructions in the form of a first faulting load instruction and a non-faulting load instruction;

FIG. 7 schematically illustrates contingent memory access program instructions in the form of memory access program instructions within a block of code marked as a memory transaction within a transactional memory system;

FIG. 8 schematically illustrates a contingent memory access program instruction in the form of a prefetch instruction;

FIG. 9 is a flow diagram schematically illustrating the determination and use of access permissions in respect of a memory access operation; and FIG. 10 illustrates a virtual machine implementation.

FIG. 1 schematically illustrates a data processing system 2 including a processor core 4 coupled to a memory 6 (e.g. a virtual address that is mapped to one or more physical memories). The processor core 4 includes a fetch unit 5 for fetching program instructions from the memory 6 and supplying these to an instruction pipeline 8. The instruction pipeline 8 includes a decode stage in which decoder circuitry 10 decodes the program instructions and generates control signals which serve to control other elements of the processor core 4 to perform processing operations specified by the decoded program instruction. It will be understood that the processor core 4 will typically include more elements than are shown in FIG. 1, but that not all of these elements are shown in order to aid clarity.

The processor core 4 includes processing circuitry 12 for performing general arithmetic and logical manipulations, for example, upon data values stored within registers of a register bank 14. Memory access circuitry 16 serves to perform memory access operations as specified by memory access program instructions decoded by the decoder circuitry 10, such as loads and stores, in respect of data values stored within the memory 6. A memory management unit 18 is responsive to translation table data 20 to control whether memory accesses to be performed are or are not permitted. The memory management unit 18 also serves to translate between virtual addresses as specified by program instructions executed by the processor core 4 and physical addresses as used to address the memory 6. The translation table data 20 used by the memory management unit 18 to determine access permissions is recovered via table walking operations controlled by a walk state machine 22 within the memory management unit 18. The walk state machine 22 is an example of memory permission circuitry which may be selectively disabled for contingent memory access operations as will be discussed further below. Recently received translation table data obtained by such table walking from the translation table data 20 by the walk state machine 22 may be cached within a translation lookaside buffer 24 within the memory management unit 18. This translation lookaside buffer 24 serves as an access permission cache as it typically stores recently used access permission data and recently used virtual to physical address translation data.

When a memory access operation is to be performed, as specified by a memory access program instruction fetched by the fetch unit 5 from the memory 6, then the memory management unit 18 determines the virtual-to-physical address translation to be applied and whether or not the memory access operation to be performed meets access permission conditions e.g. is the processor core 4 currently at the appropriate exception level to have permission to access the data concerned, is the memory access operation of a permitted type, e.g. not a write operation to data defined as read only, etc. The memory management unit 18 determines whether the access permission (and translation) data it requires is present within the translation lookaside buffer 24 for the memory access operation(s) to be performed. If there is a match (hit) between the memory access operation(s) to be performed and stored content within the translation lookaside buffer 24, then this stored content is used to determine the address translation to be applied and whether or not the memory access meets its access permissions. If there is no match in the translation lookaside buffer 24, then the walk state machine 22 (if enabled) performs a table walking operation to access within the translation table data 20 the corresponding translation and access permission data for the memory access operation(s) to be performed. If no such translation or access permission data can be found within the translation table data 20, then a translation fault arises. Such translation faults may be identified relatively rapidly, e.g. a virtual address to be translated is outside of a range of virtual addresses for which any mappings are held within the translation table data 20. If translation and access permission data is identified by the table walk operation, then such translation and access permission data is used to determine whether or not the memory access operation is permitted and, if permitted, then to generate the appropriate physical address within the memory 6 to be used for that memory access operation.

Exception level control circuitry 26 serves to control a current exception level (privilege level) at which the processor core 4 operates and to provide a signal to the memory management unit 18 indicating what is the current exception level. There are a variety of different ways in which changes in the current exception level may be made, such as, for example, exception conditions arising triggering a redirection of the point of program instruction execution and a change in the exception level. Translation table base registers 28 are provided to store a plurality of translation table base address values indicating the locations of respective translation table data to be used when operating at different exception levels. Thus, different exception levels may utilise different translation table data to apply different forms of virtual-to-physical address mapping and different access permissions. A translation control configuration register 30 stores configuration flags which serve to control the operation of the memory management unit 18 including the walk state machine 22. These configuration flags may, for example, be set under software control, such as by an operating system program or a hypervisor program.

As schematically illustrated in FIG. 1, the memory 6 includes a memory address space extending from a bottom address to a top address. Not all of this memory address space may be useable. For example, the memory address space may be provided at one end with a high region used by an operating system program and for securely storing translation table data 20. At the other end of the memory address space there may be provided a low region for use by user programs. The high region and the low region may be provided with separate translation table data pointed to by respective translation table base register values.

FIG. 2 schematically illustrates multiple possible exception levels within which the processor core 4 may operate. Exception level EL0 has a lowest level of privilege and is used for executing user programs. Increasing in privilege level (and access rights) there are further provided an exception level EL1 (typically used by operating system programs), an exception level EL2 (typically used by hypervisor programs), and an exception level EL3 (typically used by a secure monitor program). The exception levels EL0 and EL1 share translation table data and are provided with two sets of translation table data respectively pointed to within the memory address space by translation table base register values TTBR0_EL1 and TTBR1_EL1. The exception levels EL2 and EL3 each have their own translation table data, or at least the ability to provide for their own such translation table data, as pointed to by respective translation table base registers values TTBR_EL2 and TTBR_EL3.

FIG. 3 schematically illustrates an example of the layout and use of the memory address space of the memory 6 when operating in exception levels EL0 and EL1. As previously mentioned, the memory address space is provided at its top end with a high region 32 and at its bottom end with a low region 34. The high region 32 is typically used for the storage and execution of portions of the operating system kernel program. Such portions of the operating system kernel program may be distributed within the high region 32 using such techniques as KASLR (kernel address space layout randomization) in order to render malicious attempts to inappropriately control the data processing system more difficult. The high region 32 further stores translation table data TT0, TT1 used to map the virtual-to-physical address mappings and the access permissions in respect of both the high region 32 and the low region 34. More particularly, the high region 32 uses first translation table data TT1 pointed to by a first translation table base register value TTBR1_EL1. The low region 34 uses second translation table data TT0 pointed to by a second translation table base register value TTBR0_EL1.

The low region 34 stores user programs for execution in cooperation with the operating system stored within the high region 32. Illustrated in a right hand portion of FIG. 3 are respective translation table walking operations which may be performed by the memory management unit 18 in order to access virtual-to-physical address mapping data and access permission data in respect of memory accesses to be performed. Such translation table walking operations can take a relatively long time to perform as the processor core 4 is required to typically make multiple relatively slow memory accesses within the memory 6 to retrieve the appropriate data from the hierarchy of table data entries. Whether or not a particular memory access invokes such a relatively slow page table walking operation could be monitored to determine at least some characteristics of how the memory address space is configured by the translation table data in a way that may be useful to a malicious party.

FIG. 4 schematically illustrates the translation control register 30 in more detail. In particular, FIG. 4 illustrates the portions of the translation control register used for exception levels EL0 and EL1. Included within the flags stored within the translation control register 30 are a first contingent-access permission checking disable flag TCR_EL1.NFD1 applied to memory accesses to the high region 32 and a second contingent-access permission checking disable flag TCR_EL1.NFD0 applied to memory accesses to the low region 34.

The contingent-access permission checking disable flags TCR_EL1.NFD0 and TCR_EL1_NFD1 when they have a first value "1" serve to disable the walk state machine 22 (an example of memory permission circuitry) from performing a page table walk in respect of contingent memory access operations whilst a page table walk in respect of non-contingent memory access operations is permitted to be performed. In this way, scanning of the memory configuration using contingent memory access program instructions and timing analysis may be made more difficult.

The translation lookaside buffer 24 if it contains the appropriate address translation and access permission data for a memory access will provide this for use irrespective of the values of the contingent-access permission checking disable flag or flags TCR_EL1.NFD0 and TCR_EL1.NFD1. The translation lookaside buffer 24, if a match occurs, is able to return access permission data and translation data sufficiently quickly that the time differential between determining whether or not a memory access operation is permitted or not permitted by virtue of a translation error (not mapped) or a permission error (incorrect access permission) is not sufficient to render useful information to a malicious person seeking to understand the memory layout.

FIG. 5 schematically illustrates different values of the first contingent-access permission checking disable flag TCR_EL1.NFD0 and the second contingent-access permission checking disable flag TCR_EL1.NFD1 which may be used for different types of desired operation. In the case of executing normal user programs, table walking through the translation table data for the low region 34 housing the user programs themselves may be permitted while table walking through the translation table data for the high region 32 housing the operating system may be disabled for contingent memory access operations. Conversely, in the case of executing a user program in a secure mode within the low region 34, it may be desired to disable table walking for contingent memory access operations both in the low region 34 and in the high region 32. This can help avoid a malicious program obtaining information regarding the memory layout of other parts of the same program executing within the low region 34.

Contingent memory access program instructions can take a wide variety of different forms. FIG. 6 schematically illustrates two such example forms. These example forms are a first-faulting load instruction LDRFF which specifies a sequence of memory access operations to be performed. The first memory access operation to be performed in response to an LDRFF instruction is non-contingent and, if it fails its access permissions, then an exception will be triggered. The remaining memory access operations for the LDRFF instruction are contingent memory access operations and, if they fail their access permissions, then this will be indicated by setting a corresponding pass or fail value within a first-faulting register FFR as illustrated in FIG. 6, but will not affect the program flow, i.e. which is the next program instruction that will execute.

Another variant of a contingent memory access program instruction illustrated in FIG. 6 is a non-faulting load instruction LDRNF. In this case all of the memory access operations within the sequence of memory access operations concerned are contingent memory access operations whereby, if they fail their access permissions, then this does not change which will be the next program instruction to execute, but will rather be indicated by an appropriate flag value within a first-faulting register FFR as shown.

The sequence of contingent memory access operations which is performed by each of the above contingent memory access program instructions, may in some forms of the instructions be a consecutive sequence of addresses, while in other forms of instructions the addresses access may be non-contiguous, e.g. the load is a gathering load which gathers data values from various memory address locations spaced apart within the memory address space.

FIG. 7 schematically illustrates another form of contingent memory access program instructions which may be used in other embodiments of the present disclosure on its own or in combination with other forms of contingent memory access program instructions. In this example the data processing system 2 is one supporting transactional memory whereby blocks of program instructions are delimited by translation start and transaction end program instructions to indicate that any memory access operations between those delimiting points are part of a memory transaction. The transactional memory system monitors to determine whether any conflicting other memory transaction arises whilst a subject memory transaction is executed and if such a conflict arises then one or both of the memory transactions are rewound (the state of the memory restored to the state it had before the memory transactions started) and then the memory transactions are either attempted again at a later time or modified such that other mechanisms ensure that conflicts do not arise, such as the use of memory locks. In the context of FIG. 7, the memory access instructions LDR, STR, STR are made contingent memory access program instructions by virtue of their context as they lie within the delimiters of a memory transaction defined within the program code being executed. Such contingent memory access program instructions as part of a memory transaction are identified as such by the decoder circuitry 10 and accordingly the memory permission circuitry (e.g. walk state machine 22) controlled by the contingent-access permission checking disable flag to disable its permission checking operation if invoked by any of the memory access operations within the current memory transaction.

FIG. 8 schematically illustrates a further type of contingent memory access program instruction which may be used in other embodiments, or in combination with the above mentioned types of contingent memory access program instructions. In the example of FIG. 8, the contingent memory access program instruction is a prefetch instruction which may form part of the program code and serve to prefetch data values from the memory 6 into a cache memory (not shown) for performance reasons. Such prefetch instructions typically specify the starting address of a block of memory to be prefetched and a length of that block of memory. The prefetch instructions are identified by the decoder circuitry 10 as contingent memory access program instructions and accordingly if they invoke the walk state machine 22 to perform a table walk, then this will be supressed by the action of the contingent-access permission checking disable flag if this has a value indicating that the walk state machine 22 is disabled for such contingent memory access program instructions and so permission checking is disabled.

Hence, the contingent memory access program instruction may be one of:

a memory access instruction within a sequence of program instructions corresponding to a memory transaction to a transactional memory; and a prefetch instruction.

FIG. 9 is a flow-diagram schematically illustrating the operation of the data processing system 2 in access permission determination. It will be appreciated that in practice many other processes will additionally be performed as part of the operation of the data processing system 2 both at the same time and at overlapping times to the processes illustrated in FIG. 9.

At step 36, processing waits until a memory access operation to perform is received. Step 38 then determines whether or not the memory access operation received matches translation and access permission data already stored (cached) within the translation lookaside buffer 24. The way in which data is selected to be stored within the translation lookaside buffer 24 can vary, but may be controlled on the basis of algorithms such as least recently used entry, to make space for newly fetched translation and access permission data retrieved by a table walk performed by the walk state machine 22.

If there is a hit within the translation lookaside buffer 24, then processing proceeds to step 40 where a determination is made as to whether or not the memory access to be performed passes its permission tests, e.g. is of the appropriate exception level, is of the appropriate type, etc. If the permission access tests are passed, then step 42 serves to perform the access using the translated physical address obtained from the translation lookaside buffer 24. If the permissions are not passed, then step 44 serves to signal a permission fault. Such a permission fault may be signalled in a variety of ways for a contingent memory access operation, such as by setting flag values within the first-faulting registers FFR of FIG. 6, signalling the failure of a memory transaction in the case of the transactional memory of FIG. 7, simply aborting the remainder of a prefetch operation in the case of a prefetch instruction of FIG. 8 (which typically has no architectural impact). In the case of non-contingent memory access operations, a permission fault may trigger an exception or trap.

If the determination at step 38 was that there is no hit within the translation lookaside buffer 24, then a table walk by the walk state machine 22 (memory permission circuitry) is required if the translation and access permission data for that memory access operation is to be retrieved. Before such a table walk operation is performed, step 46 determines whether the memory access operation under consideration is a contingent memory access, such as one of those described in relation to FIGS. 6, 7 and/or 8. If the determination at step 46 is that the memory access operation is a contingent memory access operation, then processing proceeds to step 48 where a determination is made as to whether the contingent-access diable flag has a first value "1" indicating that the walk state machine 22 is disabled in respect of contingent memory access operations. If the contingent-access permission checking disable flag has the first value, then processing proceeds to step 50 where a translation fault is signalled, e.g. a fault corresponding to no translation table data being available for that memory access operation.

If the contingent-access disable flag is determined at step 48 to have a second value "0", then this indicates that the walk state machine 22 is not disabled in respect of contingent memory accesses and accordingly processing proceeds to step 52 where the walk state machine 22 performs a table walk operation through the translation table data 20. Step 54 determines whether any translation data and access permission data for the memory access concerned was found by the table walk operation. If no translation was found, then processing proceeds to step 50 where a translation fault is signalled. If the determination at step 54 is that a translation was found, then processing proceeds to step 54 where the access permissions in respect of the memory access concerned are tested. The translation is stored in the TLB if the table walk found a valid translation.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
   memory access circuitry responsive to a memory access program instruction of a program to perform one or more memory accesses within a memory address space, wherein
      when said memory access program instruction is a contingent memory access program instruction, said one or more memory accesses include at least one contingent memory access and program flow to a next program instruction to be executed following said contingent memory access program instructions is independent of whether said at least one contingent memory access is permitted; and
      when said memory access program instruction is a non-contingent memory access program instruction, said one or more memory accesses are one or more non-contingent memory accesses and program flow to a next program instruction to be executed following said non-contingent memory access program instructions is dependent upon whether said one or more non-contingent memory accesses is permitted; and
   memory permission circuitry to control whether said memory access circuitry is permitted to perform said memory access, wherein
      in respect of said one or more contingent memory accesses, said memory permission circuitry is responsive to a contingent-access permission checking disable flag having a first value to disable said control by said memory permission circuitry and to said contingent-access permission checking disable flag having a second value to enable said control by said memory permission circuitry; and
      in respect of said one or more non-contingent memory accesses, said control by said memory permission circuitry is independent of said contingent-access permission checking disable flag.

2. Apparatus as claimed in claim 1, wherein said memory permission circuitry is responsive to access permission data to control access to memory addresses within said memory address space.

3. Apparatus as claimed in claim 1, wherein said memory permission circuitry is part of a memory management unit and serves to perform permission table walking through permission table data.

4. Apparatus as claimed in claim 2, wherein said permission table data is translation table data that specifies virtual address to physical address mappings.

5. Apparatus as claimed in claim 1, wherein said contingent memory access program instruction is a contingent vector memory access instructions specifying a sequence of memory access operations and at least some of said sequence of memory access operations are contingent memory access operations.

6. Apparatus as claimed in claim 5, wherein a first memory access operation within said sequence of memory access operations is a non-contingent memory access operation and one or more other memory access operations within said sequence of memory access operations are contingent memory access operations.

7. Apparatus as claimed in claim 6, wherein said sequence of memory access operations are to non-contiguous addresses within said memory address space.

8. Apparatus as claimed in claim 5, wherein all of said sequence of memory access operations are contingent memory access operations.

9. Apparatus as claimed in claim 8, wherein said sequence of memory access operations are to contiguous addresses within said memory address space.

10. Apparatus as claimed in claim 1, wherein said memory address space comprises a first memory address region and a second memory address region, said memory permission circuitry is responsive to a first contingent-access permission checking disable flag to selectively disable operation of said memory permission circuitry in respective of contingent memory accesses within said first memory address region, and said memory permission circuitry is responsive to a second contingent-access permission checking disable flag to selectively disable operation of said memory permission circuitry in respective of contingent memory accesses within said second memory address region.

11. Apparatus as claimed in claim 1, comprising exception level control circuitry to control said apparatus to operate within a selectable one of a plurality of exception levels corresponding to respective privilege levels of operation.

12. Apparatus as claimed in claim 11, wherein two of said plurality of exception levels share access permission data.

13. Apparatus as claimed in claim 1, comprising an access permission cache to store access permission data and wherein, when said access permission cache stores access permission data matching said one or more contingent memory accesses, said access permission cache controls whether said memory access circuitry is permitted to perform said one or more contingent memory accesses independently of said contingent-access permission checking disable flag.

14. A method of processing data comprising:
   in response to a memory access program instruction of a program, performing one or more memory accesses within a memory address space, wherein
      when said memory access program instruction is a contingent memory access program instruction, said one or more memory accesses include at least one contingent memory access and program flow to a next program instruction to be executed following said contingent memory access program instructions is independent of whether said at least one contingent memory access is permitted; and
      when said memory access program instruction is a non-contingent memory access program instruction, said one or more memory accesses are one or more non-contingent memory accesses and program flow to a next program instruction to be executed following said non-contingent memory access program instructions is dependent upon whether said one or more non-contingent memory accesses is permitted;

controlling whether said memory access is permitted using memory permission circuitry, wherein in respect of said one or more contingent memory accesses, in response to a contingent-access permission checking disable flag having a first value, disabling said control by said memory permission circuitry and, in response to said contingent-access permission checking disable flag having a second value, enabling said control by said memory permission circuitry; and in respect of said one or more non-contingent memory accesses, said control by said memory permission circuitry is independent of said contingent-access permission checking disable flag.

15. A computer program for controlling a computer to provide a virtual machine execution environment corresponding to the apparatus according to claim 1.

* * * * *